United States Patent [19]

Matsuda et al.

[11] Patent Number: 4,709,529
[45] Date of Patent: Dec. 1, 1987

[54] HIGH-SPEED WRAPPING MACHINE

[75] Inventors: Katsumi Matsuda; Kunio Kono, both of Hiroshima, Japan

[73] Assignee: Mitsubishi Jukogyo Kabushiki Kaisha, Tokyo, Japan

[21] Appl. No.: 873,778

[22] Filed: Jun. 11, 1986

[30] Foreign Application Priority Data

Aug. 15, 1985 [JP] Japan .................................. 60-179872

[51] Int. Cl.⁴ .............................................. B65B 11/20
[52] U.S. Cl. ...................................... 53/207; 53/574; 198/836; 271/272
[58] Field of Search ................ 53/207, 209, 579, 578, 53/574; 493/125, 126, 122, 406, 438; 198/836; 271/272, 273, 274, 240, 248

[56] References Cited

U.S. PATENT DOCUMENTS

| 1,332,718 | 3/1920 | Droitcour | 271/273 |
| 2,201,605 | 5/1940 | Backhouse | 271/272 |
| 3,416,412 | 12/1968 | Wilcox | 493/122 X |
| 3,924,668 | 12/1975 | Cromeens | 198/836 X |
| 4,250,693 | 2/1981 | Andersson | 53/207 X |
| 4,369,959 | 1/1983 | Hornbuckle | 271/274 X |
| 4,463,541 | 8/1984 | Nowacki | 53/207 X |

Primary Examiner—James E. Coan
Attorney, Agent, or Firm—Wenderoth, Lind & Ponack

[57] ABSTRACT

In a sheet slider means used in a packaging system in which flat sheets are taken, one by one, out of a magazine and are delivered by a magazine conveyor, each sheet being transferred to a case transporting conveyor located adjacent the magazine conveyor and flaps of the sheet being folded and pressed for joining purposes, a high-speed wrapping machine has sheet sliders guided by guide rails and slidable in a direction at right angles to the direction in which the magazine conveyor is advanced, a device for continuously transferring the sheets in a flat fashion onto buckets formed by sheet guides provided on the case transporting conveyor, the conveyor being driven synchronously with the magazine conveyor, and a plurality of vertically and transversely adjustable press rods and press brushes provided at the upper portion of an entrance in the magazine conveyor for pressing the sheets.

2 Claims, 11 Drawing Figures

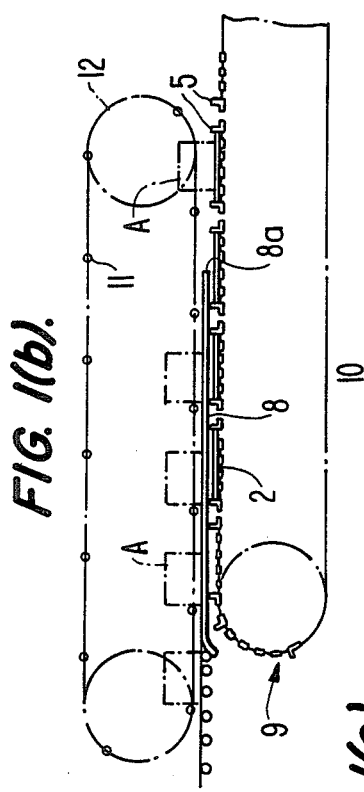
FIG. 1(a).
FIG. 1(b).
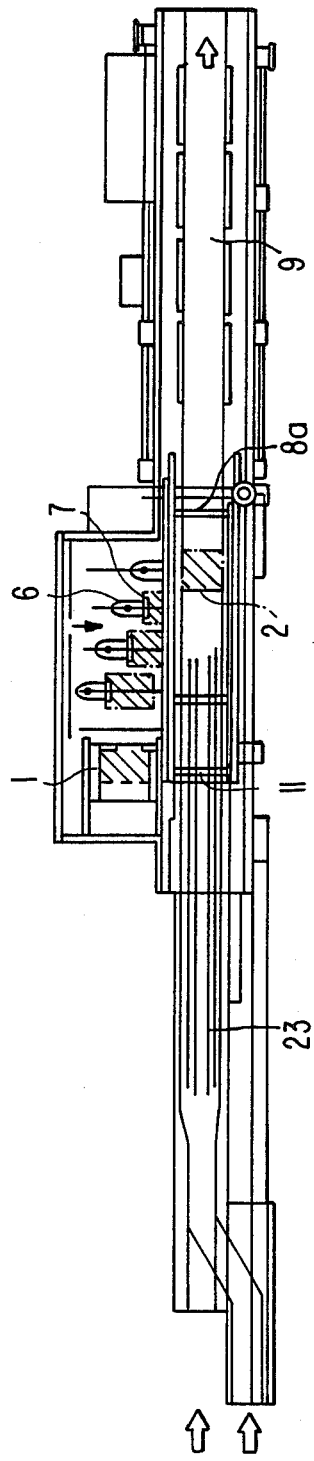
FIG. 1(c).
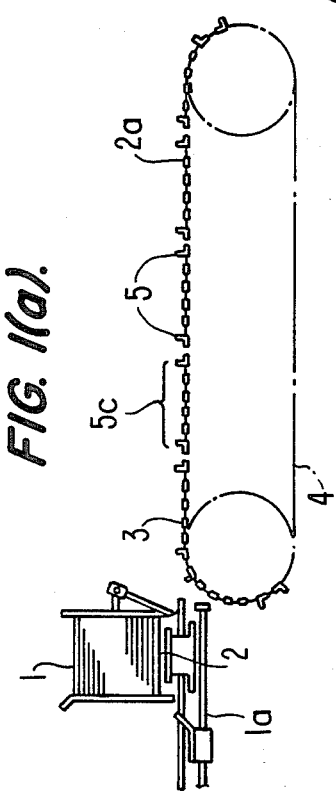
FIG. 1(d).
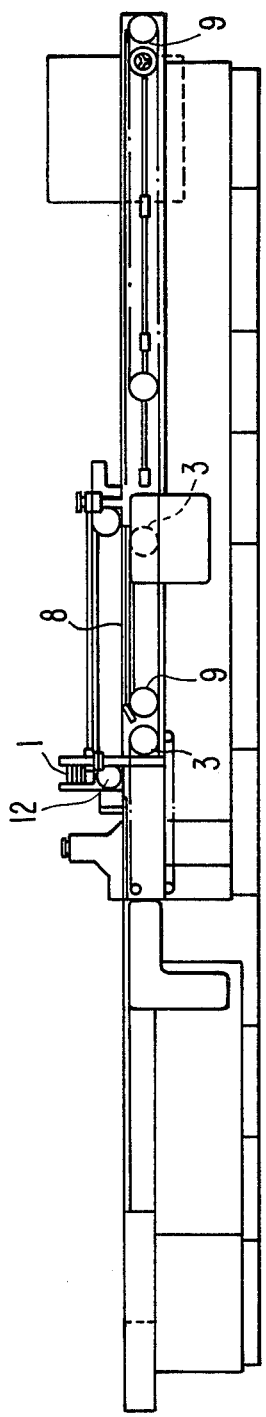

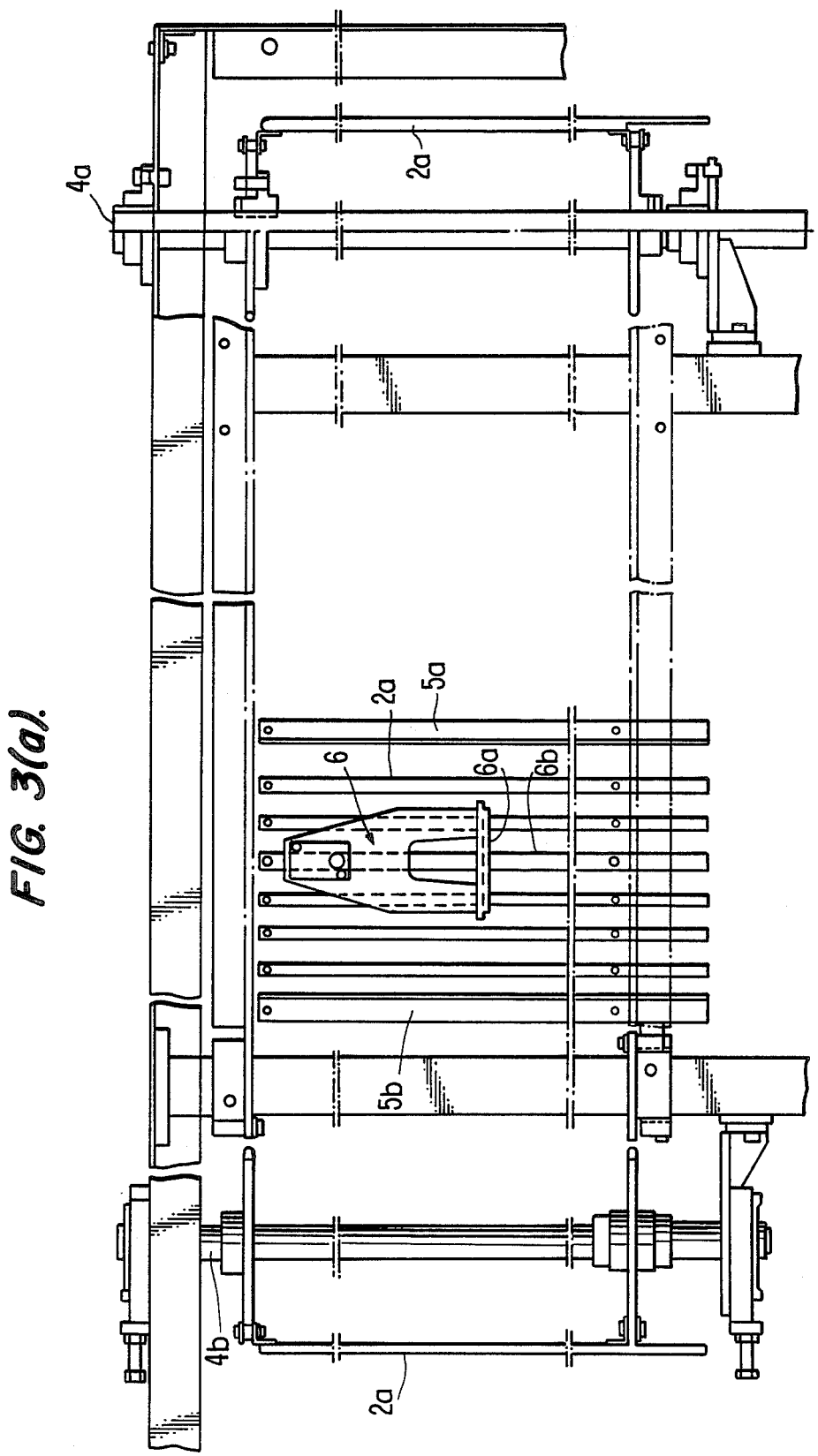

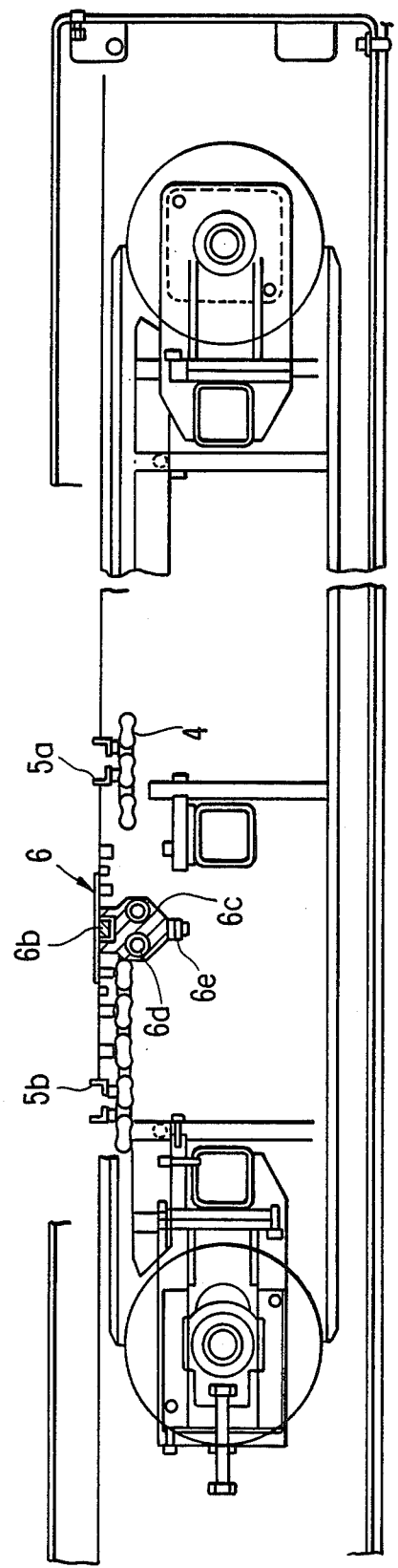

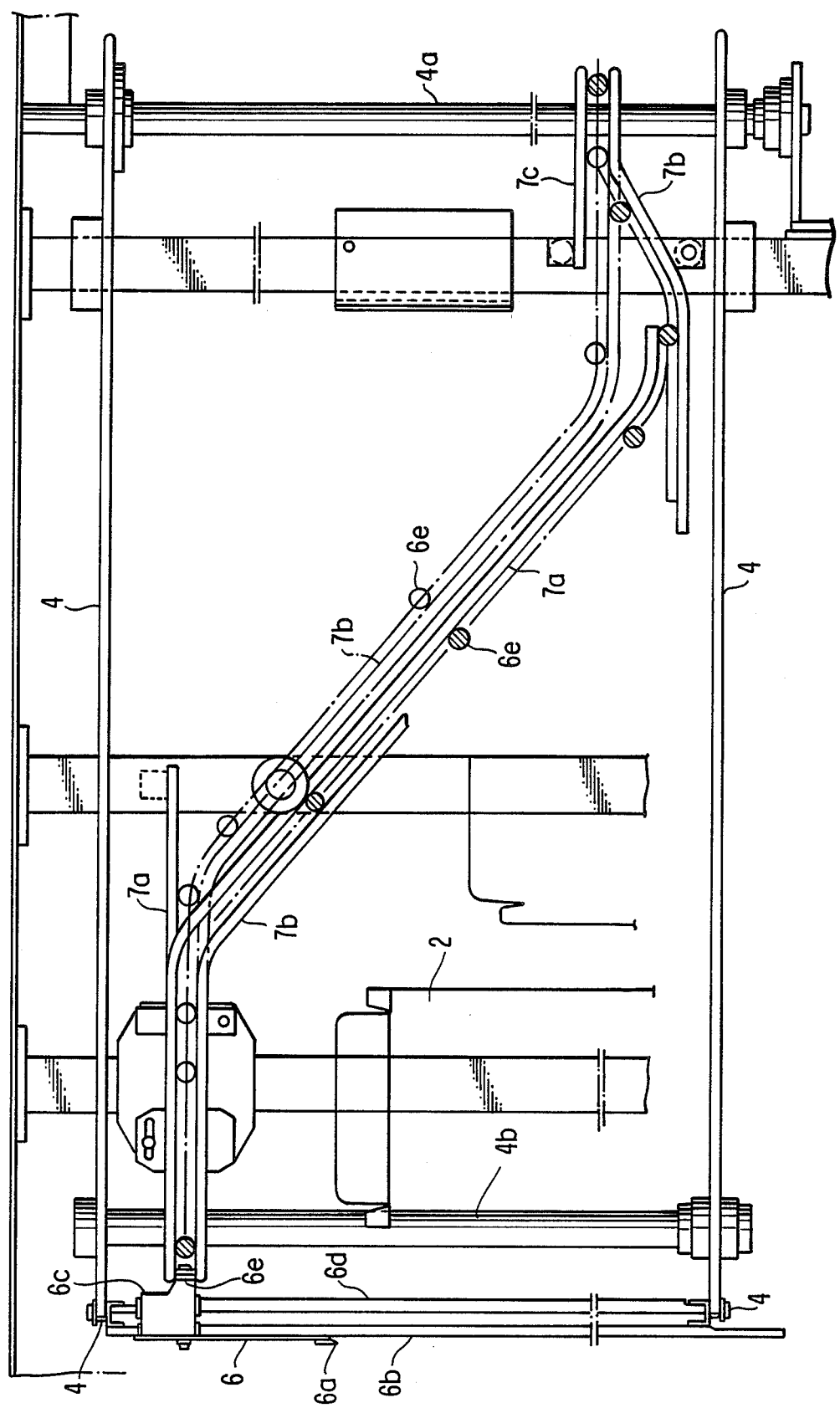

HIGH-SPEED WRAPPING MACHINE

BACKGROUND OF THE INVENTION

1. Field of the Invention

The present invention relates to a high-speed wrapping machine for use in a packaging system, which is suitable for a sheet slider or article feeding device, wherein sheets are fed, one by one, from a magazine onto a magazine conveyor and then, are continuously transferred to a case transporting conveyor located adjacent to the magazine conveyor and adapted to be operated synchronously therewith.

2. Description of the Related Art

FIG. 6 schematically illustrates a conventional packaging sysem in operation. A predetermined number of flat sheets 02 with creases are contained in a magazine M. The sheets 02 are taken out of the magazine M one by one from the bottom, by means of a sheet feeding unit 01. Each sheet 02 is stopped once. An article 03 is then fed in the direction of arrow A or B by an article feeding unit 04 and is placed on the sheet 02. The sheet 02 with the article 03 placed thereon, is moved onto a folding unit 05 by which front and rear flaps a1 of the sheet 02 are folded into a U-shape. Thereafter, the sheet, having a U-shape, is moved onto a gluing unit 06 by which inner flaps a2 of the sheet 02 are folded inwardly and glue is applied to predetermined areas thereof. The sheet 02 is finally transferred to a pressure unit 07 by which right and left side flaps a3 and a4 are folded and pressed. A case thus formed is fed to the next operation.

However, in such a conventional system, the sheet must be stopped once since the article is fed in a direction at right angles to the direction in which the sheet is advanced when placing the same on the sheet. To this end, it is necessary to intermittently feed articles onto the sheets. Thus, continuous operation can not be effected.

SUMMARY OF THE INVENTION

It is an object of the present invention to provide a high-speed wrapping machine which enables continuous operation, thereby improving productivity.

It is another object of the invention to provide a high-speed wrapping machine which is compact, thereby reducing the space required to install the same.

In a sheet slider means for use in a packaging system, wherein flat sheets are taken, one by one, out of a magazine and are delivered by a magazine conveyor, each sheet being transferred to a case transporting conveyor located adjacent the magazine conveyor and flaps of the sheet being folded and pressed for joining purposes, a high-speed wrapping machine, according to the invention, comprises sheet sliders guided by guide rails and slidable in a direction at right angles to the direction in which the magazine conveyor is advanced, means for continuously transferring the sheets in a flat fashion onto buckets formed by sheet guides provided on the case transporting conveyor, the conveyor being driven synchronously with the magazine conveyor, and a plurality of vertically and transversely adjustable press rods and press brushes provided at the upper portion of an entrance in the magazine conveyor for pressing the sheets.

The above and other objects, features and advantages of the invention will become more clear from a consideration of the following detailed description when taken in conjunction with the accompanying drawings.

BRIEF DESCRIPTION OF THE DRAWINGS

FIG. 1(a) is a side sectional view of a magazine conveyor according to one embodiment of the present invention;

FIG. 1(b) is a side sectional view of a case transporting conveyor according to the invention;

FIG. 1(c) is a top plan view of the case transporting conveyor of FIG. 1(b);

FIG. 1(d) is a side view of the case transporting conveyor of FIG. 1(b);

FIG. 3(a) is a top plan view of a sheet slider according to the invention;

FIG. 3(b) is a side view of the sheet slider of FIG. 3(a);

FIG. 4(a) is a top plan view of guide rails used in the sheet slider;

DESCRIPTION OF THE PREFERRED EMBODIMENT

Figure 2:
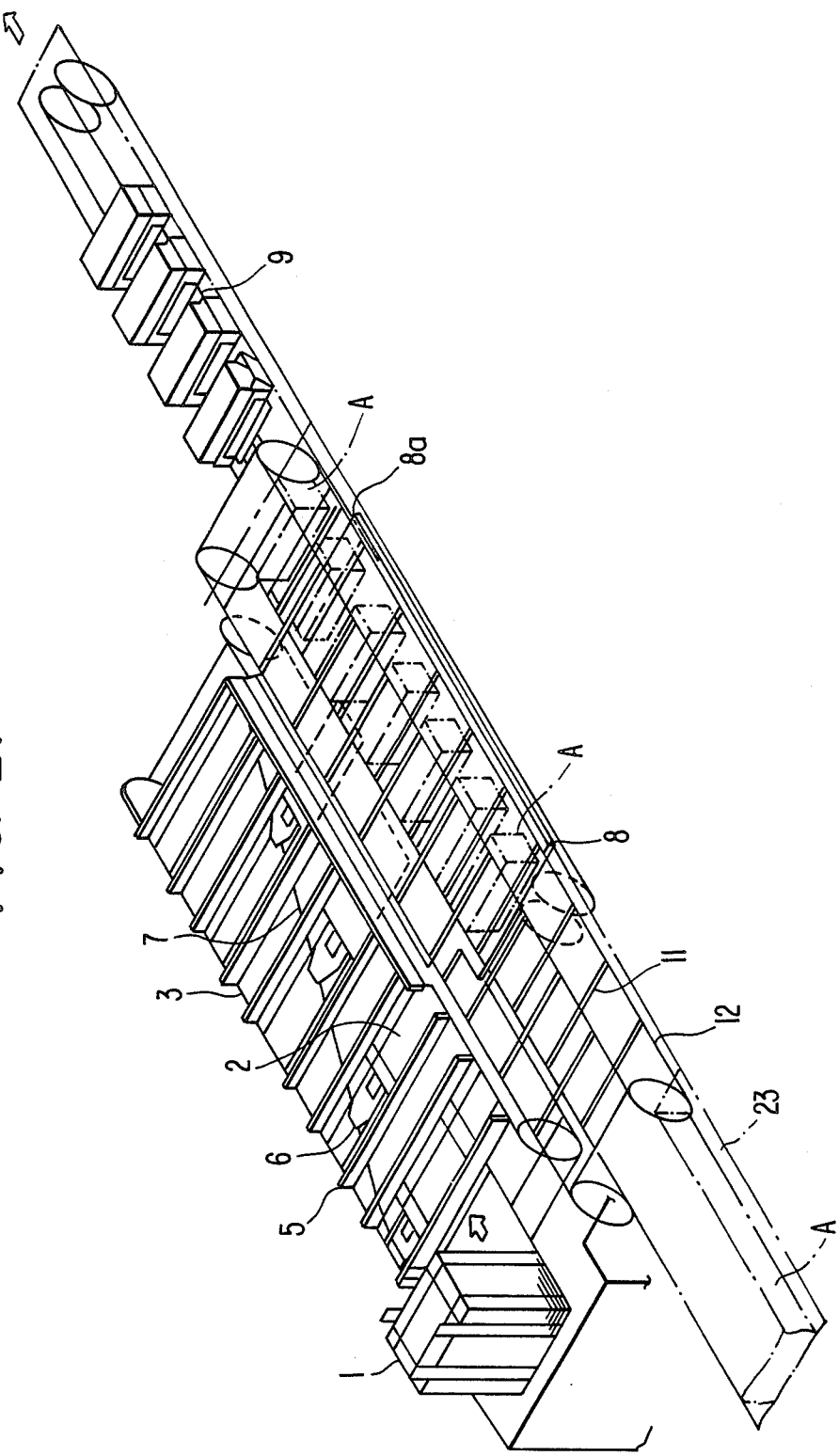
FIG. 2 is a perspective view of the case transporting conveyor of FIG. 1(b)

Referring now to the drawings and firstly to FIG. 1(a) through FIG. 1(c), a magazine 1 contains sheets 2 therein. A magazine conveyor 3 includes endless chains 4 and sheet guides 5. The sheet guides 5 are connected to the chains 4 via pins. The distance between adjacent two sheet guides 5 are equal to the width of the sheet 2. A predetermined number of sheet receiving members 2a are mounted to the endless chains 4 in a spaced relationship, and are arranged between the two sheet guides 5. Each such number of sheet receiving members 2a is hereinafter referred to as a bucket 5c. With this arrangement, each sheet 2 is fed by a sheet feeder 1a as disclosed in the Japanese patent application No. 60/138120 previously filed by the present applicant and placed between the two sheet guides 5.

Figure 4B:
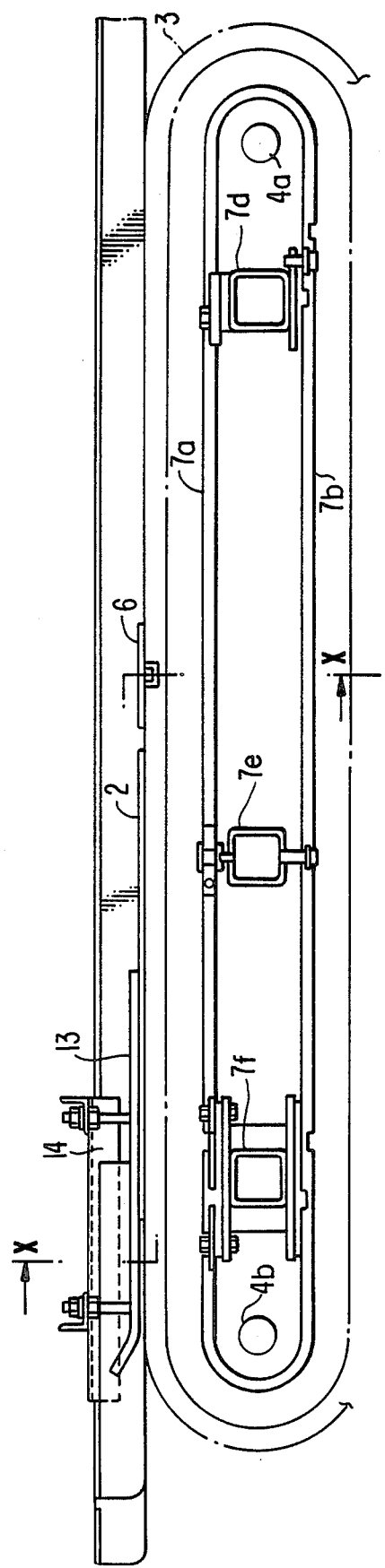
FIG. 4(b) is a side view of the guide rails of FIG. 4(a)

Arranged centrally on the bucket 5 are a predetermined number of sheet sliders 6 which are slidable on sheet slider receiving members 6b, as shown in FIGS. 3(a) and 3(b). The chains have a drive shaft 4a and a driven shaft 4b. A plurality of beams 7d, 7e, and 7f are connected at both ends thereof to frames 15a and 15b of the machine, said beams extending parallel to the drive and driven shafts as best seen in FIG. 3(b). Endless guide rails 7a, 7b and 7c are provided in such a way as to run above and below the beams 7d, 7e and 7f as shown in FIG. 4(b). The sheet sliders 6 are moved in an inclined fashion relative to the direction in which the sheet 2 is advanced, while being guided by the guide rails 7a and 7b. A case transporting conveyor 9 is located closely adjacent to the magazine conveyor 3. Each sheet 2 is fed to the case transporting conveyor 9 in a direction at right angles to the direction in which the conveyor 9 is advanced. After the sheet 2 is completely transferred to the conveyor 9, the sheet slider 6 is moved below the beams 7d, 7e and 7 and returned to its initial position while being guided by the beams 7b and 7c. In such an arrangement, the chains 4 of the magazine conveyor 3 and the chains 10 of the case transporting conveyor 9 are driven synchronously.

Figure 5:
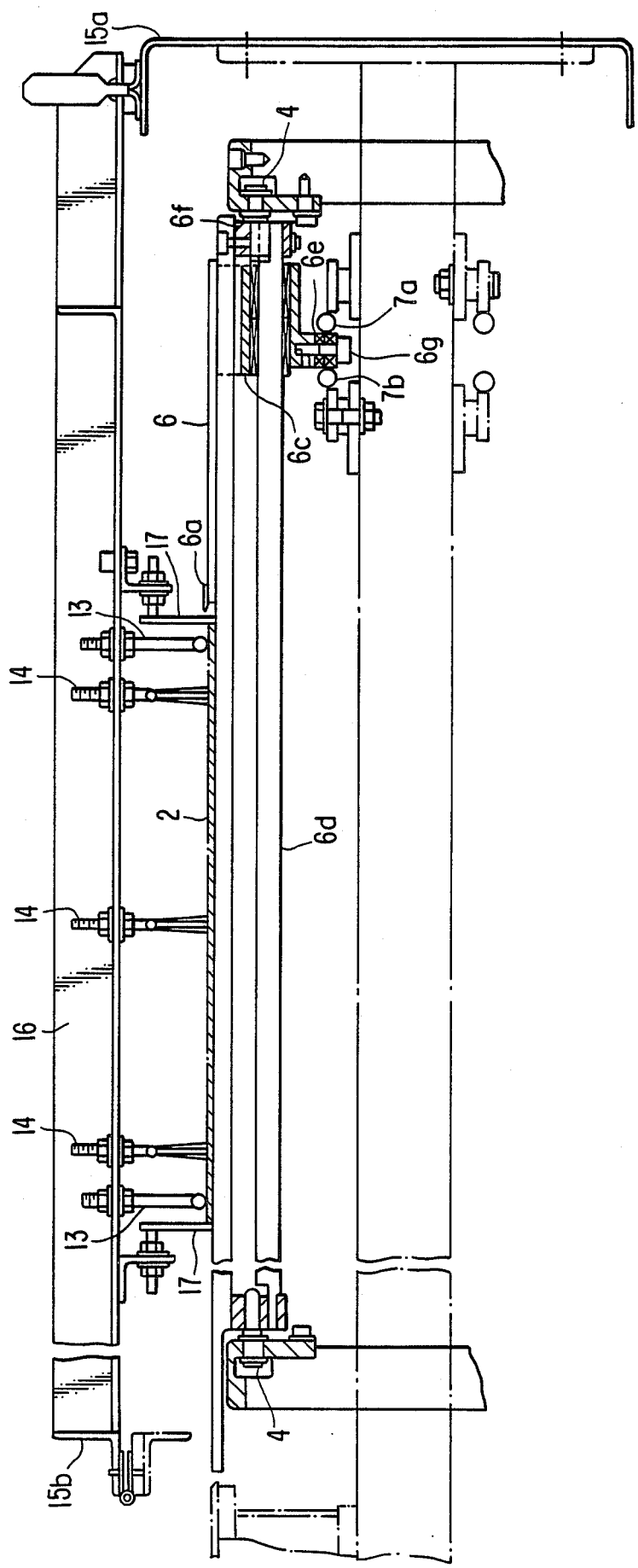
FIG. 5 is a sectional view taken along line X—X of FIG. 4(b)
Figure 6:
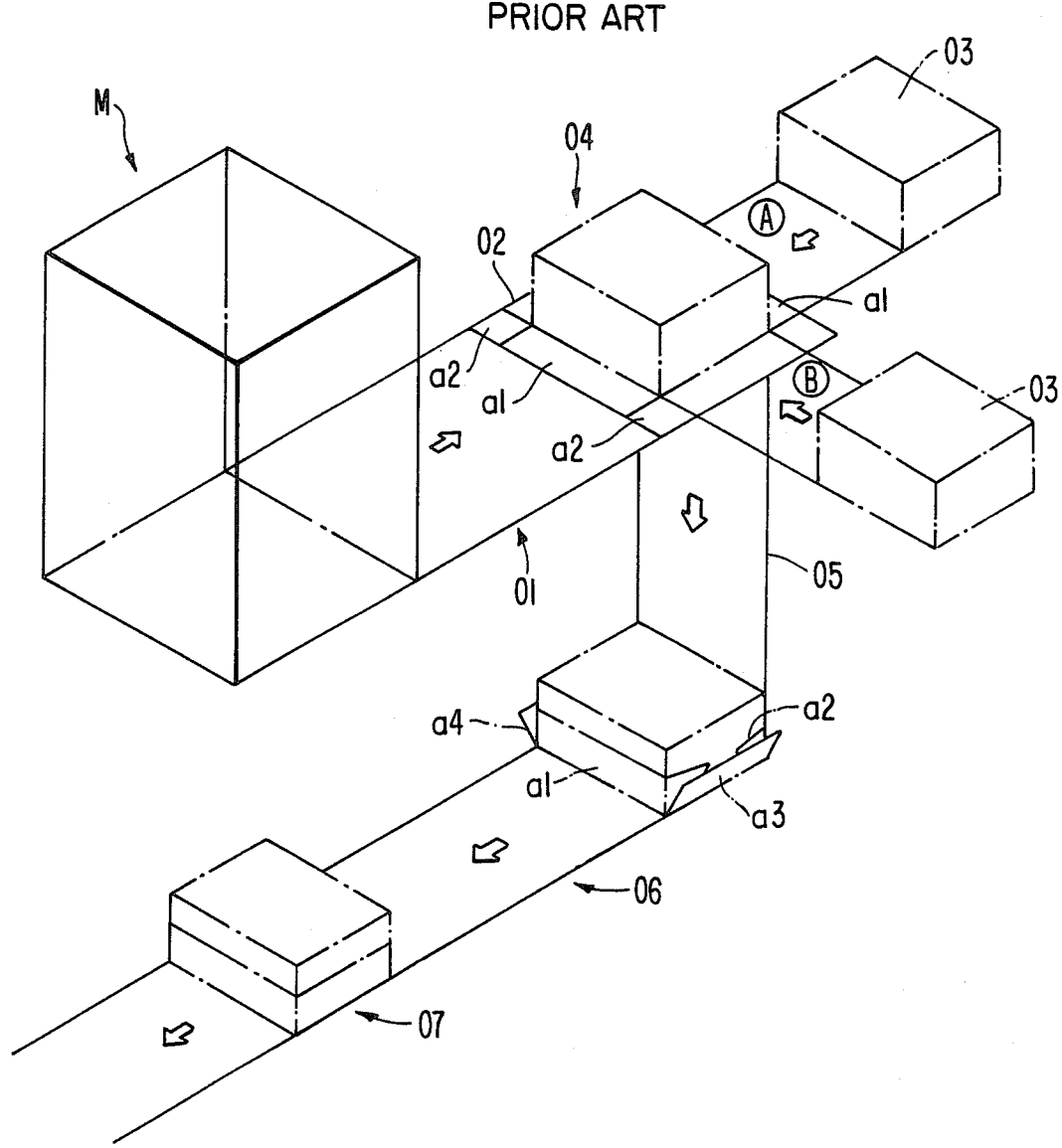
FIG. 6 is a schematic view illustrating a wrapping operation carried out by a conventional packaging system.

As shown in FIGS. 4(a) and 5, the sheet slider 6 has a pawl 6a at its forward end and is slidable on the sheet slider receiving member 6b to push the sheet 2 in a direction at right angles to the direction in which the sheet is advanced. This operation is effected by rotation of the chains 4. The sheet slider receiving member 6b is fixedly connected at both ends thereof to a slider guide 6d by right and left connecting members 6f. The connecting members 6f are, in turn, fixedly connected to the chains 4 via pins. A slider body 6c is provided in such a manner as to travel below the sheet slider receiving member 6b, and is fitted around the slider guide 6d. The sheet slider 6 is provided above the slider guide 6d, so that the sheet slider receiving member 6b is placed therebetween. Below the slider body 6c, a cam follower 6e is rotatably fitted to a pin 6g while contacting the guide rails 7a and 7b.

Again, with reference to FIGS. 3(a) and 3(b), the sheet 2 is fed from the magazine 1 to the bucket 5c arranged on the chains 4 as explained above. At this time, however, the sheet 2 may be deformed or bent due to its quality. If this occurs, when the sheet 2 is pushed by the pawl 6a at the front end of the slider 6, it is subject to damage, or may not be transferred in a flat fashion to the case transporting conveyor 9. To this end, right and left press rods 13 and a plurality of press brushes 14 are arranged at the entrance end of the magazine conveyor 3, as shown in FIG. 4(b). As is more clear in FIG. 5, a beam extends between the frames 15a and 15b. Paper guides 17 extend adjacent both ends of the sheet 2. The press rods 13 are applied to the sheet 2 in a position slightly inwardly of the paper guides 17. The plurality of press brushes 14 are arranged between the press rods 13. The paper guides, press rods and press brushes are all mounted to the beam 16, and vertically and transversely adjustable.

Next, with reference to FIGS. 1(b) and 1(c), the articles A are fed from an article transporting conveyor 23 to the case transporting conveyor 9 and then, are separated from each other in a fixed spaced relation. A dead plate 8 is slidably provided on the upper surface of the case transporting conveyor 9. Above the dead plate 8, there is provided endless flight bar transporting chains 12 for transporting the articles A in a fixed spaced relation. The chains 12 are placed parallel, and are spaced upwardly from the case transporting conveyor 9 by a predetermined space. A predetermined number of flight bars 11 are mounted in a fixed spaced relation to the chains 12. When the article A reaches an end 8a of the dead plate, it is dropped into the bucket 5c on the case transporting conveyor 9. Thereafter, the sheet with the article A placed therein, is moved onto the folding unit. At this time, the flight bar transporting chains 12 and the case transporting chains 10 are driven in a synchronous manner.

It is to be understood that the invention is not limited to the embodiment described above with reference to the accompanying drawings, but many changes and modifications may be made without departing from the spirit and scope of the invention. Accordingly, the scope of the patent protection being sought is defined by the appended claims.

What is claimed is:

1. A high speed wrapping machine for wrapping articles with flat sheets stored in a magazine, said machine comprising:
   a magazine conveyor extending in a transporting direction from said magazine for transporting the sheets one at a time from said magazine in said transporting direction,
   said magazine conveyor having a plurality of guide rails moving in said transporting direction which extend in a second direction that is perpendicular to said transporting direction, and a plurality of sheet sliders for supporting respective ones of the sheets transported by the magazine conveyor, each of said sheet sliders respectively slidably mounted on one of said guide rails, and slider means operatively connected to said sheet sliders for sliding said sheet sliders with respective ones of the sheets supported thereon along said guide rails in said second direction as the guide rails move in said transporting direction for successively delivering the sheets from the transporting conveyor in said second direction as the sheets are concurrently transported in said transporting direction;
   a case transporting conveyor adjacent and extending parallel to said magazine conveyor for receiving the sheets delivered in said second direction by said magazine conveyor, said case transporting conveyor having a plurality of sheet guides thereon defining buckets each for receiving one of the sheets delivered by said magazine conveyor, and synchronizing means for synchronously driving said case transporting conveyor in said transporting direction with said magazine conveyor; and
   articles transfer means above said transporting conveyor for continuously transferring the articles to be wrapped by the sheets onto the case transporting conveyor after the sheets have been delivered thereto by said magazine conveyor, each of the articles being transferred by said article transfer means onto one of said buckets on which a respective sheet has been received by the case transporting conveyor from the magazine conveyor.

2. A wrapping machine as claimed in claim 1, wherein said article transfer means comprises a dead plate disposed above said case transporting conveyor, and a conveyor chain for moving the articles successively along said dead plate until the articles drop thereoff and onto the buckets of said case transporting conveyor disposed below the dead plate.

* * * * *